United States Patent Office 3,256,273
Patented June 14, 1966

3,256,273
17β-TETRAHYDROPYRANYL DERIVATIVES OF ESTRADIOLS
Alexander D. Cross, Mexico City, Mexico, assignor to Syntex Corporation, Panama, Panama, a corporation of Panama
No Drawing. Filed Apr. 23, 1964, Ser. No. 362,199
17 Claims. (Cl. 260—239.55)

This invention relates to novel cyclopentanopolyhydrophenanthrene derivatives and to processes for the preparation thereof.

More particularly, this invention relates to novel 17-tetrahydropyranyl ethers and 3,17-bis(tetrahydropyranyl) ethers of estradiol and estradiol derivatives, all represented by the general formula:

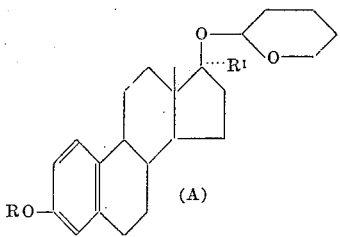

In this formula R represents hydrogen, a lower alkyl (including cycloalkyl) group, such as methyl, ethyl, propyl, hexyl, cyclopentyl, cyclohexyl, and the like, an aryl (including aralkyl) group containing from 6 to 10 carbon atoms, inclusive, such as phenyl, benzyl, and the like, an acyl group containing less than 12 carbon atoms, or a tetrahydropyranyl group, and $R^1$ represents hydrogen, a lower alkyl group, a lower alkenyl group, e.g., vinyl or the like, or a lower alkynyl (including halo-lower alkenyl) group, such as ethynyl, fluoroethynyl, chloroethynyl, bromoethynyl, propynyl, butynyl, hexynyl, and the like.

The acyl groups referred to herein are preferably derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The novel 17-tetrahydropyranyl ethers and 3,17-bis-(tetrahydropyranyl) ethers represented by the above general formula exhibit enhanced estrogenic activity when administered orally, and are useful in the control of fertility.

The novel 17-tetrahydropyranyl ethers of the present invention wherein the 3-hydroxy group is etherified with a lower alkyl or aryl group or esterified can be obtained from the corresponding 3(lower alkyl or aryl) etherified and 3-esterified 17β-free hydroxy estradiol derivatives, i.e., as depicted in the following equation:

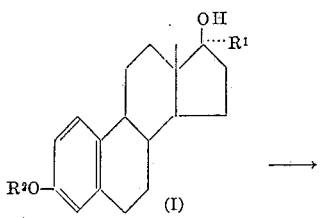

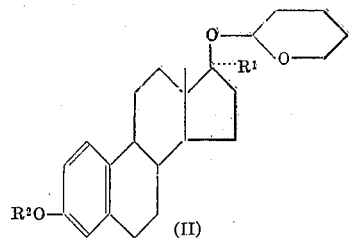

In the above formulas, $R^1$ has the same meaning as described hereinabove and $R^2$ represents a lower alkyl (including cycloalkyl) group, an aryl (including aralkyl) group containing from 6 to 10 carbon atoms, inclusive, or an acyl group containing less than 12 carbon atoms. The 17β-tetrahydropyranyl ethers can be produced by conventional methods of preparing tetrahydropyranyl ethers of steroids having free hydroxyl groups. Thus, the free 17β-ol-containing parent compound can be reacted under substantially anhydrous conditions, with an excess of dihydropyran in the presence of a small amount of an acidic catalyst, e.g., hydrochloric acid, p-toluenesulfonic acid, boron trifluoride etherate, and the like, either alone or together with an inert organic solvent such as benzene, diethyl ether, or the like, at a temperature of from about 0° C. to about 50° C., and preferably at room temperature (about 25° C.) for from about 25 minutes to about 24 hours.

An illustrative but by no means exhaustive listing of such 3-esterified and -etherified 17-tetrahydropyranyl ethers includes:

17β-tetrahydropyranyloxy-$\Delta^{1,3,5(10)}$-estratrien-3-ol 3-acetate,
17β-tetrahydropyranyloxy-$\Delta^{1,3,5(10)}$-estratrien-3-ol 3-caproate,
17α-methyl-17β-tetrahydropyranyloxy-$\Delta^{1,3,5(10)}$- estratrien-3-ol 3-propionate,
17α-vinyl-17β-tetrahydropyranyloxy-$\Delta^{1,3,5(10)}$-estratrien-3-ol 3-butyrate,
17α-ethynyl-17β-tetrahydropyranyloxy-$\Delta^{1,3,5(10)}$-estratrien-3-ol 3-acetate,
17α-fluoroethynyl-17β-tetrahydropyranyloxy-$\Delta^{1,3,5(10)}$-estratrien-3-ol 3-benzoate,
17α-chloroethynyl-17β-tetrahydropyranyloxy-$\Delta^{1,3,5(10)}$-estratrien-3-ol 3-cyclopentylpropionate,
17α-bromoethynyl-17β-tetrahydropyranyloxy-$\Delta^{1,3,5(10)}$-estratrien-3-ol 3-acetate,
17α-propynyl-17β-tetrahydropyranyloxy-$\Delta^{1,3,5(10)}$-estratrien-3-ol 3-propionate,
3-methoxy-17β-tetrahydropyranyloxy-$\Delta^{1,3,5(10)}$-estratriene,
17α-methyl-3-ethoxy-17β-tetrahydropyranyloxy-$\Delta^{1,3,5(10)}$-estratriene,
17α-vinyl-3-phenoxy-17β-tetrahydropyranyloxy-$\Delta^{1,3,5(10)}$-estratriene,
17α-ethynyl-3-methoxy-17β-tetrahydropyranyloxy-$\Delta^{1,3,5(10)}$-estratriene,
17α-fluoroethynyl-3-benzoxy-17β-tetrahydropyranyloxy-$\Delta^{1,3,5(10)}$-estratriene,
17α-chloroethynyl-3-ethoxy-17β-tetrahydropyranyloxy-$\Delta^{1,3,5(10)}$-estratriene,
17α-bromoethynyl-3-propoxy-17β-tetrahydropyranyloxy-$\Delta^{1,3,5(10)}$-estratriene,
17α-propynyl-3-phenoxy-17β-tetrahydropyranyloxy-$\Delta^{1,3,5(10)}$-estratriene,
17α-hexynyl-3-methoxy-17β-tetrahydropyranyloxy-$\Delta^{1,3,5(10)}$-estratriene,
and the like.

The novel 17-tetrahydropyranyl ethers of the present invention having a free 3-hydroxy group can be obtained from the corresponding 3-etherified-17β-tetrahydropyranyloxy estradiol derivatives, as illustrated by the following equation:

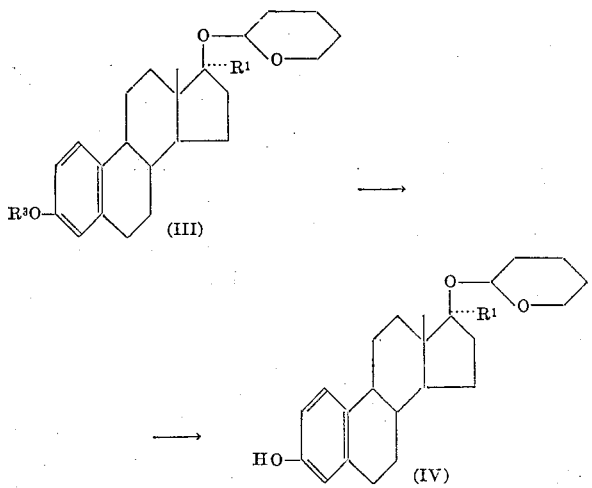

In the above formulas, $R^1$ has the same meaning as hereinabove described and $R^3$ represents an acyl group containing less than 12 carbon atoms, and preferably an acetyl group.

In practicing the process outlined above, the 3-esterified 17β-tetrahydropyranyloxy estradiol derivative, dissolved in a mixture of water and methanol containing from about 0.02 gram to about 1 gram of sodium hydroxide, potassium hydroxide, or the like, per gram of starting steroid, can be reacted at a temperature of from about 0° C. to about 50° C. for from about 10 minutes to about 6 hours to selectively hydrolyze the 3-acyloxy group.

Included among the free 3-hydroxy 17-tetrahydropyranyl ethers which can be obtained in this manner are:

17β-tetrahydropyranyloxy-$\Delta^{1,3,5(10)}$-estratrien-3-ol,
17α-methyl-17β-tetrahydropyranyloxy-$\Delta^{1,3,5(10)}$-estratrien-3-ol,
17α-vinyl-17β-tetrahydropyranyloxy-$\Delta^{1,3,5(10)}$-estratrien-3-ol,
17α-ethynyl-17β-tetrahydropyranyloxy-$\Delta^{1,3,5(10)}$-estratrien-3-ol,
17α-fluoroethynyl-17β-tetrahydropyranyloxy-$\Delta^{1,3,5(10)}$-estratrien-3-ol,
17α-chloroethynyl-17β-tetrahydropyranyloxy-$\Delta^{1,3,5(10)}$-estratrien-3-ol,
17α-bromoethynyl-17β-tetrahydropyranyloxy-$\Delta^{1,3,5(10)}$-estratrien-3-ol,
17α-propynyl-17β-tetrahydropyranyloxy-$\Delta^{1,3,5(10)}$-estratrien-3-ol,
17α-hexynyl-17β-tetrahydropyranyloxy-$\Delta^{1,3,5(10)}$-estratrien-3-ol,
and the like.

The 3-hydroxy group in the thus-obtained 17β-tetrahydropyranyloxy-3-free hydroxy estradiol derivatives can be reesterified by conventional procedures. Thus, for example, esterification can be carried out in an inert organic solvent, preferably pyridine, collidine, lutidine, or the like, as well as mixtures thereof with each other or with one or more other organic solvents, such as benzene, toluene, xylene, and the like, at a temperature ranging from about room temperature or lower to reflux temperature for from about 30 minutes to about 15 hours or longer, using either an acyl halide, preferably the chloride, or an anhydride of one of the aforementioned acids.

The 3-hydroxy group in the novel 17β-tetrahydropyranyloxy-3-free hydroxy estradiol derivatives can also be etherified by conventional methods. For example, the lower alkyl, cycloalkyl and aralkyl ethers can be prepared by refluxing the free 3-hydroxy compound, dissolved in a lower alkanol, such as methanol, ethanol, and the like, containing an acid-binding agent such as potassium carbonate or the like, with a lower alkyl, cycloalkyl or aralkyl halide, preferably the iodide. The methyl ether can also be prepared by refluxing the free 3-hydroxy compound with dimethyl sulfate in a lower alkanol containing a base, such as potassium hydroxide and the like. Aryl ethers such as the phenyl ether are prepared by first preparing the sodium salt if the 3-hydroxy group, e.g., by evaporating a mixture of the free 3-hydroxy compound and metallic sodium to dryness under reduced pressure, and then reacting the thus-obtained sodium salt, dissolved in an inert organic solvent such as dioxane, diglyme, or the like, with an aryl halide, e.g., phenyl bromide, at room temperature to form the corresponding 3-aryl ether.

These conventional esterification and etherification procedures can also be employed to esterify or etherify the 3-hydroxy groups in estradiol and its 17α-lower alkyl, alkenyl and alkynyl derivatives to provide the starting materials used in preparing the novel 3-esterified and -etherified 17β-tetrahydropyranyloxy compounds of the present invention.

The novel 3,17-bis(tetrahydropyranyl) ethers of the present invention can be obtained from estradiol or a 17α-lower alkyl alkenyl or alkynyl derivative thereof, as represented by the following schematic equation:

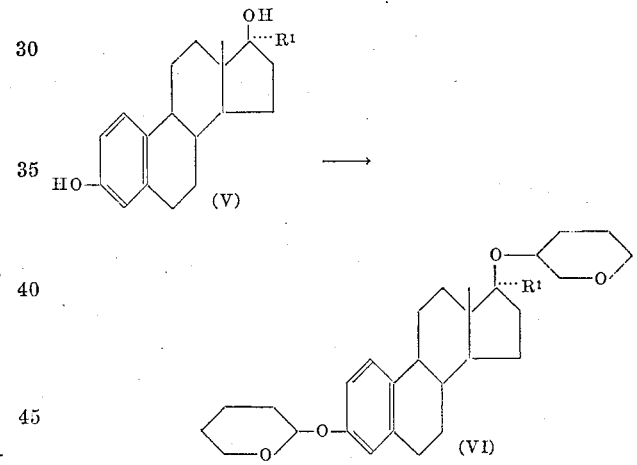

wherein $R^1$ is the same as described heretofore. The above reaction can be carried out in the manner described hereinabove for the preparation of the novel 3-estherified or -etherified 17β-tetrahydropyranyloxy derivatives of the present invention (Compounds II), i.e., by reacting the 3,17-diol with an excess of dihydropyran, with the reaction preferably taking place at room temperature for from about 30 minutes to about 24 hours.

These 3,17-bis(tetrahydropyranyl) ethers can also be prepared from the 3-tetrahydropyranyl ether of estrone. Thus, for example, estrone 3-tetrahydropyranyl ether, dissolved in an inert organic solvent, e.g., a lower alkanol such as methanol, and ether such as dioxane or tetrahydrofuran, or the like, can be reacted with a double metal hydride, e.g., lithium aluminum hydride, sodium borohydride, and the like, at a temperature ranging from room temperature to reflux temperature for from about 1 hour to about 24 hours, to give estradiol 3-tetrahydropyranyl ether (3-tetrahydropyranyloxy-$\Delta^{1,3,5(10)}$-estratrien-17β-ol). This 17β-ol is then etherified with an excess of dihydropyran, in the manner described hereinabove, with the reaction preferably taking place at room temperature for from about 30 minutes to about 24 hours, to give estradiol 3,17-bis(tetrahydropyranyl) ether.

In preparing the 17α-lower alkyl, alkenyl and alkynyl derivatives of estradiol 3,17-bis(tetrahydropyranyl) ether from estrone 3-tetrahydropyranyl ether, the starting material is first converted to a 17α-lower alkyl, alkenyl or alkynyl derivative of estradiol 3-tetrahydropyranyl ether by conventional methods. For example, estrone 3-tetrahydropyranyl ether can be refluxed in thiophene-free benzene, under substantially anhydrous conditions, with a lower alkyl, alkenyl or alkynyl magnesium halide, such as methyl, vinyl or ethynyl magnesium bromide, or the like, for about 3 hours or longer. Similarly, estrone 3-tetrahydropyranyl ether, dissolved in absolute diethyl ether, can be reacted under a nitrogen atmosphere with a lower alkyl, alkenyl or alkynyl lithium compound, such as ethyl lithium, vinyl lithium, ethynyl lithium, or the like, for 48 hours or longer at room temperature. Estrone 3-tetrahydropyranyl ether can also be dissolved in anhydrous benzene containing potassium t-amylate and reacted under a nitrogen atmosphere with gaseous acetylene at room temperature for 40 hours or longer to give the corresponding 17α-ethynyl-17β-hydroxy derivative, which can then be hydrogenated by known methods to the corresponding 17α-vinyl or 17α-ethyl derivative.

The thus-obtained 17α-lower alkyl, alkenyl and alkynyl 17β-hydroxy derivatives are then etherified with an excess of dihydropyran, in the manner described hereinabove, with the reaction preferably taking place at room temperature for from about 30 minutes to about 24 hours, to give the corresponding 17α-lower alkyl, alkenyl and alkynyl derivatives of estradiol 3,17-bis(tetrahydropyranyl) ether.

Included among the 3,17-bis(tetrahydropyranyl) ethers of the present invention represented by Formula VI hereinabove are:

Estradiol 3,17-bis(tetrahydropyranyl) ether,
17α-methylestradiol 3,17-bis(tetrahydropyranyl) ether,
17α-ethylestradiol 3,17-bis(tetrahydropyranyl) ether,
17α-vinylestradiol 3,17-bis(tetrahydropyranyl) ether,
17α-ethynylestradiol 3,17-bis(tetrahydropyranyl) ether,
17α-fluoroethynylestradiol 3,17-bis(tetrahydropyranyl) ether,
17α-chloroethynylestradiol 3,17-bis(tetrahydropyranyl) ether,
17α-bromoethynylestradiol 3,17-bis(tetrahydropyranyl) ether,
17α-propynylestradiol 3,17-bis(tetrahydropyranyl) ether,
17α-hexynylestradiol 3,17-bis(tetrahydropyranyl) ether, and the like.

The novel tetrahydropyranyl ethers of formula A herein above wherein $R^1$ represents a halo-lower alkynyl group, e.g., fluoroethynyl, chloroethynyl or bromoethynyl, can be prepared from estrone or a derivative thereof by a reaction sequence which can be illustrated schematically as follows:

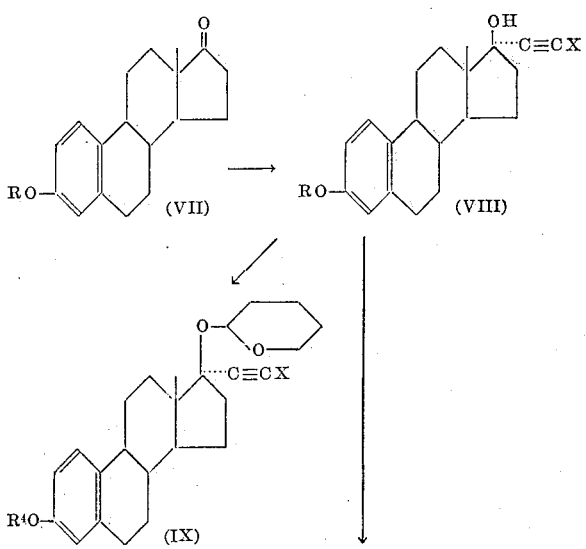

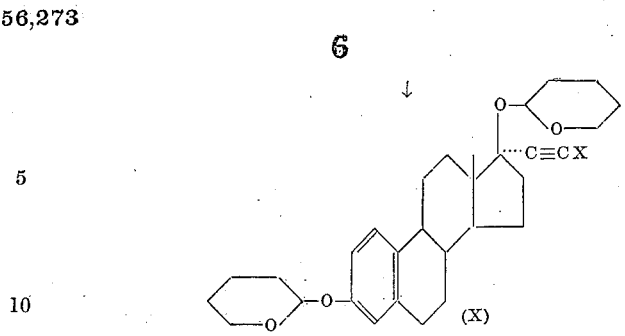

In these formulas R has the same meaning as described heretofore, $R^4$ represents hydrogen, a lower alkyl (including cycloalkyl) group, an aryl (including aralkyl) group containing from 6 to 10 carbon atoms, inclusive, or an acyl group containing less than 12 carbon atoms, and X represents a halogen, e.g., fluorine, chlorine or bromine.

In the first step of this reaction sequence, a 1,2-dihaloethylene wherein at least one of the halogens is other than fluorine, e.g., 1-chloro-2-fluoroethylene, 1,2-dichloroethylene or 1,2-dibromoethylene, dissolved in anhydrous diethyl ether, is slowly admixed at 0° C., under a nitrogen atmosphere, with a solution of methyl lithium in anhydrous diethyl ether (prepared, for example, by adding lithium to methyl iodide in anhydrous diethyl ether solution under a nitrogen atmosphere at about 10° C.). This mixture is then held at room temperature, with stirring, for from about 90 minutes to about 12 hours, following which the steroid starting material, e.g., estrone 3-methyl ether (VII: R=CH₃), is slowly added and the resulting reaction mixture is held at room temperature for from about 12 hours to about 18 hours to give the corresponding 17α-haloethynylestradiol or a 3-substituted derivative thereof (VIII). Where 1-chloro-2-fluoroethylene is used, a 17α-fluoroethynyl substituent is obtained; 1,2-dichloroethylene gives a 17α-chloroethynyl substituent, and 1,2-dibromoethylene gives a 17α-bromoethynyl substituent. Thus, for example, when using estrone 3-methyl ether as the steroid starting material, the 3-methyl ethers of 17α-fluoroethynyl-estradiol, 17α-chloroethynylestradiol and 17α-bromoethynylestradiol, respectively, can be obtained.

The thus-obtained 17α-ethynylestradiol (VIII: R=hydrogen) or 3-substituted derivative thereof (VIII: R≠hydrogen) is then etherified with an excess of dihydropyran, in the manner described hereinabove. When R in compound VIII is other than hydrogen or a tetrahydropyranyl group, the corresponding 17-tetrahydropyranyl ether (IX) is obtained. When R in Compound XIII is hydrogen or a tetrahydropyranyl group, the corresponding 3,17-bis(tetrahydropyranyl) ether (X) is obtained. The 17β-tetrahydropyranyl ethers of Compound (IX) wherein R represents an acyl group can be de-esterified, in the manner described hereinabove, to provide the corresponding 3-free hydroxy compounds.

The novel tetrahydropyranyl ethers of the present invention containing a 17α-chloro- or bromo-lower alkynyl group, e.g., chloroethynyl or bromoethynyl, can also be prepared from 17α-ethynylestradiol and derivatives thereof by a reaction sequence which can be illustrated schematically as follows:

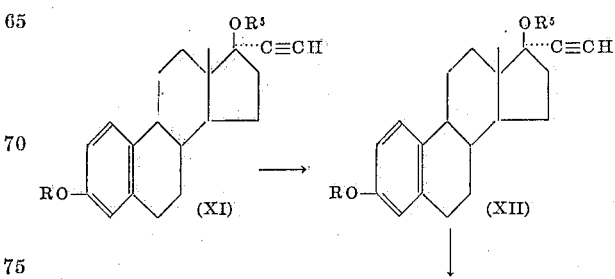

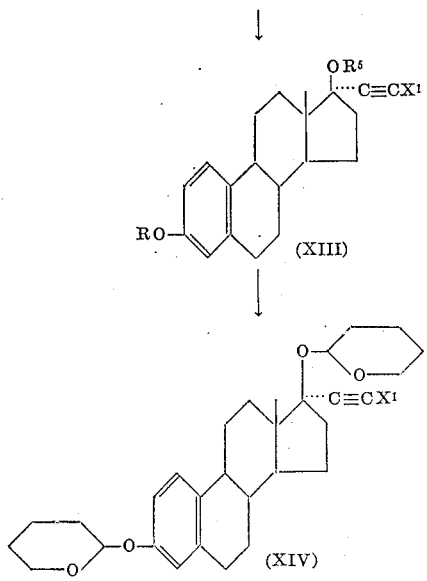

In the above formulas, R has the same meaning as heretofore described, $R^5$ represents hydrogen or a tetrahydropyanyl group, and $X^1$ represents chorine or bromine.

In carrying out this reaction sequence, the starting material, e.g., 17α-ethynylestradiol (XI: R and $R^5$=hydrogen), dissolved in a tertiary alcohol containing the potassium t-alkoxide of said alcohol, e.g., a mixture of t-butyl alcohol and potassium t-butoxide, is refluxed for about 1 hour or more to form the corresponding 21-potassium derivative (XII), e.g., the 21-potassium derivative of 17α-ethynylestradiol.

The thus-obtained 21-potassium derivative is then halogenated to form the corresponding 17α-haloethynyl steroid (XIII), e.g., 17α-chloroethynylestradiol or 17α-bromoethynyl estradiol. The chloro derivative is preferably prepared by adding t-butyl hydrochlorite to the solution of the 21-potassium derivative in the tertiary alcohol and allowing the resulting reaction mixture to remain at room temperature, with stirring, overnight. Similarly, the bromo derivative is preferably prepared by adding N-bromosuccinimide to the solution of the 21-potassium derivative in the tertiary alcohol and then stirring the resulting reaction mixture at room temperature for about 18 hours or longer.

Where $R^5$ in Compound (XIII) is hydrogen and R is other than hydrogen, etherification of this compound with an excess of dihydropyran, in the manner described hereinabove, produces the corresponding 17-tetrahydropyranyl ether (which can also be obtained starting from the 17-tetrahydropyranyl ether of 17α-ethynylestradiol), (XIII: R≠hydrogen). Deesterification of those 17-tetrahydropyranyl ethers of Compound XIII wherein R represents an acyl group, in the manner described hereinabove, produce the corresponding 3-free hydroxy compounds. Etherification of the 17-tetrahydropyranyl ethers of Compound XIII wherein R is hydrogen, again in the manner described hereinabove, gives the corresponding 3,17-bis(tetrahydropyranyl) ethers (XIV).

The 17-tetrahydropyranyl ethers and 3,17-bis(tetrahydropyranyl) ethers of the present invention can be administered in any of a number of conventional pharmaceutical forms, and particularly in ones suited for oral administration, e.g., in solid form, such as in pills, powders, capsules, tablets, or the like, or in liquid form, as syrups, emulsions, suspensions, and the like.

In order that those skilled in the art can more fully understand the present invention, the following examples are set forth. These examples are given solely for the purpose of illustrating the invention, and should not be considered as expressing limitations unless so set forth in the appended claims.

PREPARATION A

A solution of 8.5 grams of 1-chloro-2-fluoroethylene in 50 cc. of anhydrous diethyl ether was added dropwise, with stirring, at 0° C. over a half hour period, to 15 cc. of a 1.4 N solution of methyl lithium in anhydrous diethyl ether, contained under a nitrogen atmosphere, and this mixture was then held at room temperature, with stirring, for an additional 90 minutes. Next, a solution of 0.5 gram of estrone 3-methyl ether in 20 cc. of anhydrous diethyl ether was added dropwise, with stirring, over a 15 minute period, following which the resulting reaction mixture was held at room temperature, with stirring, overnight. Following this reaction period the reaction mixture was poured into ice water and extracted with diethyl ether. The combined ether extract was then washed with water, dried over anhydrous sodium sulfate and concentrated under vacuum. Chromatography of the residue on basic alumina, using petroleum ether/diethyl ether (8:2, respectively) as the eluant, followed by crystallization from acid-free methanol, gave 17α-fluoroethynylestradiol 3-methyl ether.

By repeating this procedure in every detail but one, namely, replacing 1-chloro-2-fluoro-ethylene with 1,2-dichloroethylene and 1,2-dibromoethylene, respectively, 17α-chloroethynylestradiol 3-methyl ether and 17α-bromoethynylestradiol 3-methyl ether, respectively, were obtained.

Similarly, by replacing estrone 3-methyl ether with estrone 3-acetate and using, in turn, 1-chloro-2-fluoroethylene, 1,2-dichloroethylene, and 1,2-dibromoethylene, 17α-fluoroethynylestradiol 3-acetate, 17α-chloroethynylestradiol 3-acetate and 17α-bromoethynylestradiol 3-acetate, respectively, were obtained.

PREPARATION B

A solution of 0.17 gram of potassium hydroxide in 0.2 cc. of water and 2.5 cc. of methanol was added over a 30 minute period to a boiling solution of 1 gram of 17α-fluoroethynylestradiol 3-acetate in 30 cc. of methanol, contained under a nitrogen atmosphere. The resulting reaction mixture was then boiled for an additional 2 hours, after which the reaction mixture was cooled, neutralized with acetic acid and concentrated under reduced pressure. Next, water was added to the cooled solution, and the thus-formed precipitate was collected by filtration, dried and then crystallized from acetone/hexane to give 17α-fluoroethynylestradiol.

This procedure was repeated, using 17α-chloroethynylestradiol 3-acetate and 17α-bromoethynylestradiol 3-acetate, to give 17α-chloroethynylestradiol and 17α-bromoethynylestradiol, respectively.

Example I

To a solution of 1 gram of estradiol 3-methyl ether in 25 cc. of benzene there was added 2 cc. of dihydropyran. Next, approximately 5 cc. of the mixture of benzene and dihydropyran was distilled off to remove moisture, and the remaining mixture was then cooled to room temperature. To the cooled mixture there was then added 0.1 gram of p-toluenesulfonic acid, and the resulting reaction mixture was held at room temperature for 12 hours. Following this reaction period the reaction mixture was washed with an aqueous 5% sodium carbonate solution and then with water until neutral, then dried over anhydrous sodium sulfate and evaporated to dryness. The dry residue was then chromatographed by passing it, dissolved in hexane, through a column of neutral alumina, thus giving the 17-tetrahydropyranyl ether of estradiol 3-methyl ether (3-methoxy-17β-tetrahydropyranyloxy-$\Delta^{1,3,5(10)}$-estratriene).

By repeating this procedure in every detail but one, namely, replacing estradiol 3-methyl ether with estradiol 3-benzyl ether, 17α-methylestradiol 3-methyl ether, 17α-vinylestradiol 3-methyl ether, 17α-fluoroethynylestradiol- 3-methyl ether, 17α-chloroethynylestradiol 3-methyl ether, 17α-bromoethynylestradiol 3-methyl ether, estradiol 3-acetate, estradiol 3-propionate, estradiol 3-trimethylacetate, estradiol 3-t-butylacetate, estradiol 3-cyclopentylpropionate, estradiol 3-benzoate, 17α-methylestradiol 3-acetate, 17α-methylestradiol 3-benzoate, 17α-vinylestradiol 3-acetate, 17α-vinylestradiol 3-benzoate, 17α-ethynylestardiol 3-acetate, 17α-ethynylestradiol 3-benzoate, 17α-fluoroethynylestradiol 3-acetate, 17α-chloroethynylestradiol 3-acetate and 17α-bromoethynylestradiol 3-acetate, respectively, the corresponding 17-tetrahydropyranylethers, namely 3-benzoxy-17β-tetrahydropyranyloxy-Δ$^{1,3,5(10)}$-estratriene,
17α-methyl-3-methoxy-17β-tetrahydropyranyloxy-Δ$^{1,3,5(10)}$-estratriene,
17α-vinyl-3-methoxy-17β-tetrahydropyranyloxy-Δ$^{1,3,5(10)}$-estratriene,
17α-fluoroethynyl-3-methoxy-17β-tetrahydropyranyloxy-Δ$^{1,3,5(10)}$-estratriene,
17α-chloroethynyl-3-methoxy-17β-tetrahydropyranyloxy-Δ$^{1,3,5(10)}$-estratriene,
17β-tetrahydropyranyloxy-Δ$^{1,3,5(10)}$-estratrien-3-ol acetate,
17β-tetrahydropyranyloxy-Δ$^{1,3,5(10)}$-estratrien-3-ol propionate,
17β-tetrahydropyranyloxy-Δ$^{1,3,5(10)}$-estratrien-3-ol trimethylacetate,
17β-tetrahydropyranyloxy-Δ$^{1,3,5(10)}$-estratrien-3-ol t-butylacetate,
17β-tetrahydropyranyloxy-Δ$^{1,3,5(10)}$-estratrien-3-ol cyclopentylpropionate,
17β-tetrahydropyranyloxy-Δ$^{1,3,5(10)}$-estratrien-3-ol benzoate,
17α-methyl-17β-tetrahydropyranyloxy-Δ$^{1,3,5(10)}$-estratrien-3-ol acetate,
17α-methyl-17β-tetrahydropyranyloxy-Δ$^{1,3,5(10)}$-estratrien-3-ol benzoate,
17α-vinyl-17β-tetrahydropyranyloxy-Δ$^{1,3,5(10)}$-estratrien-3-ol acetate,
17α-vinyl-17β-tetrahydropyranyloxy-Δ$^{1,3,5(10)}$-estratrien-3-ol benzoate,
17α-ethynyl-17β-tetrahydropyranyloxy-Δ$^{1,3,5(10)}$-estratrien-3-ol acetate,
17α-ethynyl-17β-tetrahydropyranyloxy-Δ$^{1,3,5(10)}$-estratrien-3-ol benzoate,
17α-fluoroethynyl-17β-tetrahydropyranyloxy-Δ$^{1,3,5(10)}$-estratrien-3-ol acetate,
17α-chloroethynyl-17β-tetrahydropyranyloxy-Δ$^{1,3,5(10)}$-estratrien-3-ol acetate and
17β-bromoethynyl-17β-tetrahydropyranyloxy-Δ$^{1,3,5(10)}$-estratrien-3 ol acetate, respectively, were obtained.

Similarly, by replacing estradiol 3-methyl ether with estradiol, 17α-methylestradiol, 17α-vinylestradiol, 17α-ethynylestradaiol, 17α-fluoroethynylestradiol, 17α-chloroethynylestradiol and 17α-bromoethynylestradiol, respectively, as the steroid starting materials, using 5 cc. of dihydropyran and carrying out the reaction for 2 hours, all other factors being the same, the corresponding 3,17-bis(tetrahydropyranyl) ethers, namely 3,17β-bis(tetrahydropyranyloxy)-Δ$^{1,3,5(10)}$-estratriene,
17α-methyl-3,17-bis(tetrahydropyranyloxy)-Δ$^{1,3,5(10)}$-estratriene,
17α-vinyl-3,17-bis(tetrahydropyranyloxy)-Δ$^{1,3,5(10)}$-estratriene,
17α-ethynyl-3,17β-bis(tetrahydropyranyloxy)-Δ$^{1,3,5(10)}$-estratriene,
17α-fluoroethynyl-3,17β-bis(tetrahydropyranyloxy)-Δ$^{1,3,5(10)}$-estratriene,
17α-chloroethynyl-3-17β-bis(tetrahydropyranloxy)-Δ$^{1,3,5(10)}$-estratriene and
17α-bromoethynyl-3,17β-bis(tetrahydropyranyloxy)-Δ$^{1,3,5(10)}$-estratriene, respectively, were obtained.

*Example II*

17β-tetrahydropyranyloxy-Δ$^{1,3,5(10)}$-estratrien-3-ol acetate,
17α-methyl-17β-tetrahydropyranyloxy-Δ$^{1,3,5(10)}$-estratrien-3-ol acetate,
17α-vinyl-17β-tetrahydropyranyloxy-Δ$^{1,3,5(10)}$-estratrien-3-ol acetate,
17α-ethynyl-17β-tetrahydropyranyloxy-Δ$^{1,3,5(10)}$-estratrien-3-ol acetate,
17α-fluoroethynyl-17β-tetrahydropyranyloxy-Δ$^{1,3,5(10)}$-estratrien-3-ol acetate,
17α-chloroethynyl-17β-tetrahydropyranyloxy-Δ$^{1,3,5(10)}$-estratrien-3-ol acetate and
17α-bromoethynyl-17β-tetrahydropyranyloxy-Δ$^{1,3,5(10)}$-estratrien-3-ol acetate were treated in the manner described in Preparation B hereinabove to give the corresponding free 3-hydroxy compounds, namely, 17β-tetrahydropyranyloxy-Δ$^{1,3,5(10)}$-estratrien-3-ol,
17α-methyl-17β-tetrahydropyraneloxy-Δ$^{1,3,5(10)}$-estratrien-3-ol,
17α-vinyl-17β-tetrahydropyranyloxy-Δ$^{1,3,5(10)}$-estratrien-3-ol,
17α-ethynyl-17β-tetrahydropyranyloxy-Δ$^{1,3,5(10)}$-estratrien-3-ol,
17α-fluoroethynyl-17β-tetrahydropyranyloxy-Δ$^{1,3,5(10)}$-estratrien-3-ol,
17α-chloroethynyl-17β-tetrahydropyranyloxy-Δ$^{1,3,5(10)}$-estratrien-3-ol and
17α-bromoethynyl-17β-tetrahydropyranyloxy-Δ$^{1,3,5(10)}$-estratrien-3-ol.

*Example III*

Twenty cc. of dimethyl sulfate and a solution of 80 grams of potassium hydroxide in 50 cc. of water were added alternatively, in 5 cc. portions, over a 30 minute period to a refluxing solution of 5 grams of 17α-ethynyl-17β-tetrahydropyranyloxy-Δ$^{1,3,5(10)}$-estratrien-3-ol in 500 cc. of ethanol. The resulting reaction mixture was then refluxed for an additional 45 minutes, following which it was cooled, poured into ice water and neutralized with hydrochloric acid. The thus-formed precipitate was collected, washed with water, dried and then crystallized from chloroform/methanol to give 17α-alkynyl-3-methoxy-17β-tetrahydropyranyloxy-Δ$^{1,3,5(10)}$-estratriene.

It will be obvious to those skilled in the art that other changes and variations can be made in carrying out the present invention without departing from the spirit and scope thereof as defined in the appended claims.

I claim:

1. A compound represented by the general formula:

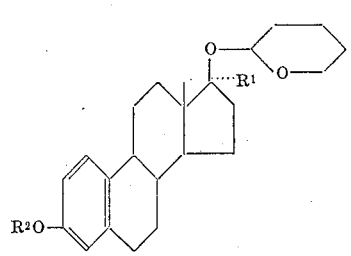

wherein $R^1$ is selected from the group consisting of hydrogen, a lower alkyl group, a lower alkenyl group and a lower alkynyl group and $R^2$ is selected from the group consisting of a lower alkyl group, an aryl group containing from 6 to 10 carbon atoms, inclusive, an an acyl group containing less than 12 carbon atoms.

2. 3-methoxy - 17β - tetrahydropyranyloxy - Δ$^{1,3,5(10)}$-estratriene.

3. 17β-tetrahydropyranyloxy-Δ$^{1,3,5(10)}$-estratrien-3-ol 3-acetate.

4. 17α - methyl - 17β - tetrahydropyranyloxy-Δ$^{1,3,5(10)}$-estratrien-3-ol 3-acetate.

5. 17α - vinyl-17β - tetrahydropyranyloxy - Δ$^{1,3,5(10)}$-estratrien-3-ol 3-acetate.

6. 17α-ethynyl - 17β - tetrahydropyranyloxy - Δ$^{1,3,5(10)}$-estratrien-3-ol 3-acetate.

7. 17α - fluoroethynyl - 17β - tetrahydropyranyloxy-Δ$^{1,3,5(10)}$-estratrien-3-ol 3-acetate.

8. 17α - chloroethynyl - 17β - tetrahydropyranyloxy-Δ$^{1,3,5(10)}$-estratrien-3-ol 3-acetate.

9. 17α - bromoethynyl - 17β - tetrahydropyranyloxy-Δ$^{1,3,5(10)}$-estratrien-3-ol 3-acetate.

10. A compound represented by the general formula:

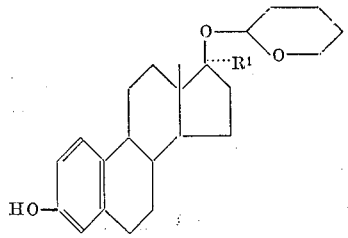

wherein R$^1$ is selected from the group consisting of hydrogen, a lower alkyl group, a lower alkenyl group and a lower alkynyl group.

11. 17β - tetrahydropyranyloxy - Δ$^{1,3,5(10)}$ - estratrien-3-ol.

12. 17α - methyl - 17β - tetrahydropyranyloxy-Δ$^{1,3,5(10)}$-estratrien-3-ol.

13. 17α - vinyl - 17β - tetrahydropyranyloxy-Δ$^{1,3,5(10)}$-estratrien-3-ol.

14. 17α - ethynyl - 17β - tetrahydropyranyloxy-Δ$^{1,3,5(10)}$-estratrien-3-ol.

15. 17α - fluoroethynyl - 17β - tetrahydropyranyloxy-Δ$^{1,3,5(10)}$-estratrien-3-ol.

16. 17α - chloroethynyl - 17β - tetrahydropyranyloxy-Δ$^{1,3,5(10)}$-estratrien-3-ol.

17. 17α - bromoethynyl - 17β - tetrahydropyranyloxy-Δ$^{1,3,5(10)}$-estratrien-3-ol.

References Cited by the Examiner

UNITED STATES PATENTS

| | | | |
|---|---|---|---|
| 2,666,769 | 1/1954 | Colton | 260—397.4 |
| 2,939,819 | 6/1960 | Barton et al. | 167—65 |
| 3,134,771 | 5/1964 | de Ruggieri et al. | 260—239.55 |

OTHER REFERENCES

Applezweig: Steroid Drugs, page 453, 1962, McGraw-Hill Co., New York, RM–799–A6.

Loewenthal: Tetrahedron, vol. 6, page 303, June 1959.

LEWIS GOTTS, *Primary Examiner.*

HENRY A. FRENCH, *Assistant Examiner.*